US012607245B2

(12) United States Patent
Kim

(10) Patent No.: US 12,607,245 B2
(45) Date of Patent: Apr. 21, 2026

(54) DAMPING FORCE CONTROLLING SHOCK ABSORBER

(71) Applicant: HL MANDO CORPORATION, Pyeongtaek-si (KR)

(72) Inventor: Youngjae Kim, Daejeon (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 652 days.

(21) Appl. No.: 17/983,772

(22) Filed: Nov. 9, 2022

(65) Prior Publication Data

US 2023/0146639 A1    May 11, 2023

(30) Foreign Application Priority Data

Nov. 10, 2021    (KR) ......................... 10-2021-0154285
Oct. 18, 2022    (KR) ......................... 10-2022-0133861

(51) Int. Cl.
    *F16F 9/516*        (2006.01)
    *F16F 9/18*         (2006.01)
    (Continued)

(52) U.S. Cl.
    CPC .............. *F16F 9/516* (2013.01); *F16F 9/185* (2013.01); *F16F 9/348* (2013.01); *B60G 13/08* (2013.01);
    (Continued)

(58) Field of Classification Search
    CPC ...................................................... F16F 9/516
    See application file for complete search history.

(56) References Cited

U.S. PATENT DOCUMENTS

2013/0038118 A1*    2/2013    Brinkley ................. B60T 11/21
                                                                303/9.62
2015/0047937 A1*    2/2015    Kim ........................ F16F 9/461
                                                                188/322.13
(Continued)

FOREIGN PATENT DOCUMENTS

CN        104373498 A        2/2015
CN        112041587 A        12/2020
        (Continued)

OTHER PUBLICATIONS

German Office Action issued on Jan. 17, 2025, in connection with the German Patent Application No. 10 2022 211 934.7, with its English translation, 17 pages.
(Continued)

*Primary Examiner* — Melody M Burch
(74) *Attorney, Agent, or Firm* — Hauptman Ham, LLP

(57)            ABSTRACT

The present disclosure relates to a shock absorber, in more detail, a damping force controlling shock absorber of which a damping force characteristic can be appropriately adjusted. A damping force controlling shock absorber according to the present disclosure includes: a cylinder formed in a double structure of an inside and an outside, having an internal space divided into a compression chamber and a rebound chamber by a piston valve, and having a reservoir chamber in an external space; a compression solenoid valve mounted on the cylinder; a rebound solenoid valve mounted on the cylinder; and a check valve disposed in the rebound solenoid valve, and opening and closing a channel connecting the reservoir chamber and the rebound chamber.

15 Claims, 10 Drawing Sheets

(51) Int. Cl.

| | |
|---|---|
| *F16F 9/348* | (2006.01) |
| *B60G 13/08* | (2006.01) |
| *B60G 17/08* | (2006.01) |

(52) U.S. Cl.
CPC .......... *B60G 17/08* (2013.01); *B60G 2202/24* (2013.01); *B60G 2204/62* (2013.01); *B60G 2206/41* (2013.01); *B60G 2500/114* (2013.01); *B60G 2800/162* (2013.01); *F16F 2222/12* (2013.01); *F16F 2228/066* (2013.01); *F16F 2232/08* (2013.01); *F16F 2234/02* (2013.01)

(56) References Cited

U.S. PATENT DOCUMENTS

| | | | | |
|---|---|---|---|---|
| 2018/0355940 | A1* | 12/2018 | Manger | .................. F16F 9/369 |
| 2021/0140505 | A1 | 5/2021 | Deferme et al. | |
| 2021/0283974 | A1 | 9/2021 | Kim | |

FOREIGN PATENT DOCUMENTS

| | | | | |
|---|---|---|---|---|
| DE | 198 33 854 | A1 | 2/1999 | |
| DE | 11 2010 005 255 | T5 | 5/2013 | |
| DE | 102014009067 | A1 * | 2/2015 | .............. F16F 9/185 |
| DE | 10 2017 216 922 | A1 | 3/2019 | |
| DE | 10 2019 220 484 | A1 | 7/2020 | |
| DE | 10 2021 202 007 | A1 | 9/2021 | |
| KR | 20150019526 | A * | 2/2015 | |
| KR | 20150019527 | A * | 2/2015 | |
| KR | 10-2020-0109606 | A | 9/2020 | |

OTHER PUBLICATIONS

Office Action issued on May 17, 2025, for corresponding Chinese patent application No. 202211402365.8, along with an English translation (18 pages).

Office Action issued on Jan. 12, 2026, for corresponding Chinese patent application No. 202211402365.8, along with an English translation (16 pages).

* cited by examiner

100

81

81a

82

822b

822

822a

821

DAMPING FORCE CONTROLLING SHOCK ABSORBER

TECHNICAL FIELD

The present disclosure relates to a shock absorber, in more detail, a damping force controlling shock absorber of which a damping force characteristic can be appropriately adjusted.

BACKGROUND

As a vehicle is popularized, the level of knowledge and demand of consumers for a vehicle are gradually increasing. Not only the use, convenience, and economics of a vehicle, but also functional performance such as the power, comfort, riding comfort, and steering stability are considered as important factors for selection of consumers who purchase vehicles.

A vehicle continuously receives vibration or shock from a road surface through wheels during driving. When vibration or shock that is transmitted through wheels is intactly transmitted to the car body and the steering wheel, riding comfort and driving stability are considerably deteriorated. Accordingly, vehicles have to be necessarily equipped with a suspension. A shock absorber, a spring, a suspension arm, etc. are main components that constitute a suspension.

A shock absorber is composed of a cylinder, a piston rod, a piston valve, etc. The piston valve is coupled to the piston rod and disposed in the cylinder, and generates a damping force.

A shock absorber has a characteristic that when the damping force is set at a low level, it can improve riding comfort by absorbing vibration due to unevenness of a road surface, whereas when the damping force is set at a high level, posture variation of a car body is suppressed, so steering stability is improved. Accordingly, it was general in the related art that shock absorbers in which different damping force characteristics are set are selectively used, depending on the purpose of use of vehicles.

Recently, a damping force controlling shock absorber that can appropriately adjust a damping force characteristic in accordance with the state of a road surface, a driving state, etc. by being equipped with damping force-variable valve that can appropriately adjust a damping force characteristic of a shock absorber has been developed.

For example, a damping force controlling shock absorber having a dual solenoid valve structure including a rebound solenoid valve for adjusting a damping force in a rebound stroke and a compression solenoid valve for adjusting a damping force in a compression stroke has been developed.

The inside of a cylinder included in a shock absorber is divided into a compression chamber and a rebound chamber by a piston valve, and these chambers are each filled with fluid, such as oil.

The piston valve presses the liquid in the compression chamber in the compression stroke, whereby the pressure of the compression chamber is increased and the pressure of the rebound chamber is relatively decreased. The piston valve presses the liquid in the rebound chamber in the rebound stroke, whereby the pressure of the rebound chamber is increased and the pressure of the compression chamber is relatively decreased.

The operation structure of the damping force controlling shock absorber having a dual solenoid valve structure in the related art is described.

In the compression stroke, the fluid in the compression chamber moves to a reservoir chamber through the compression solenoid valve and a portion of the fluid moves to the rebound chamber through a bypass channel of the piston valve.

In the rebound stroke, the fluid in the rebound chamber moves to the reservoir chamber through the rebound solenoid valve and a portion of the fluid moves to the compression chamber through the bypass channel of the piston valve.

According to the damping force controlling shock absorber having this operation structure in the related art, when a portion of the fluid in the compression chamber is sent to the rebound chamber through the bypass channel of the piston valve in the compression stroke, the channel of the rebound solenoid valve connected to the reservoir chamber at a low pressure relatively to the rebound chamber is opened. Accordingly, there is a problem that the damping force that is generated in the compression stroke depends on the rebound solenoid valve, so independence of the compression solenoid valve is deteriorated.

Meanwhile, when the amount of fluid that moves to the rebound chamber in the compression stroke is small, the amount of fluid in the rebound chamber may become insufficient and a lag may be generated when the compression stroke is changed into the rebound stroke. This phenomenon may depend on the kind of the valve that opens/closes the bypass channel in the piston valve.

For example, a compression stroke may be set into a hard mode to overcome a handling characteristic, and to this end, a shutoff valve of a bypass channel may be configured in a sandwich type having a disc stack structure. In this case, the amount of fluid that is sent is unavoidably small in comparison to the shutoff valve having a lifting structure.

As described above, when a lag is generated, a damping force is unavoidably decreased, but there is an alternative measure for preventing a lag in the damping force controlling shock absorber of the related art.

PRIOR ART DOCUMENT (Patent Document 001) Korean Patent No. 10-0842031 (published on 2008 Jun. 27)

SUMMARY

The present disclosure has been made in an effort to solve the problems of the related art described above and an objective of the present disclosure is to provide a damping force controlling shock absorber that can prevent reduction of a damping force by improving operational independence of a compression solenoid valve and a rebound solenoid valve.

Another objective of the present disclosure is to provide a damping force controlling shock absorber that can prevent a lag when a rebound stroke is entered by preventing the amount of fluid in a rebound chamber from becoming insufficient in a compression stroke.

In order to achieve the objectives, a damping force controlling shock absorber according to a preferred embodiment of the present disclosure includes: a cylinder formed in a double structure of an inside and an outside, having an internal space divided into a compression chamber and a rebound chamber by a piston valve, and having a reservoir chamber in an external space; a compression solenoid valve mounted on the cylinder; a rebound solenoid valve mounted on the cylinder; and a check valve disposed in the rebound solenoid valve, and opening and closing a channel connecting the reservoir chamber and the rebound chamber.

The damping force controlling shock absorber according to a preferred embodiment of the present disclosure further includes post member mounted outside the cylinder, and fixing and supporting the solenoid valves with a gap therebetween.

A communicating hole connecting the solenoid valves is formed in the post member.

The rebound solenoid valve has a rebound port that is connected to the rebound chamber and through which fluid flows inside and outside, and the channel connecting the reservoir chamber and the rebound chamber is formed in the rebound port.

The check valve is disposed in the channel.

The check valve includes: a shutoff member opening and closing the channel; and an elastic member elastically supporting the shutoff member.

The check valve allows for flow of fluid from the reservoir chamber to the rebound chamber and prevents flow of fluid in the opposite direction.

The check valve is opened in a compression stroke and is closed in a rebound stroke.

The rebound solenoid valve includes: a rebound valve housing that forms an external appearance of the valve and in which fluid in the rebound chamber flows and circulates in the rebound stroke; and the rebound port disposed at an inlet of the rebound valve housing, and the check valve is installed between the rebound port and the rebound valve housing.

The rebound port includes: a rebound body formed in a hollow pipe shape and connected to the rebound chamber at a first end; a rebound flange extending outward from a second end of the rebound body and having a rebound hole connected to the reservoir chamber; and an annular protrusion protruding toward the rebound valve housing from the rebound flange, having the channel therein, and forming a space in which the check valve is installed, and the channel is connected to the reservoir chamber, the rebound hole, the internal space of the protrusion, the inside of the rebound body, and the rebound chamber.

The shutoff member of the check valve is configured to open and close an upper end of the rebound hole in the check valve installation space, and the elastic member elastically supports the shutoff member with respect to the rebound valve housing in the check valve installation space.

Fluid in the reservoir chamber flows inside through a lower end of the rebound hole and pushes the shutoff member, so the rebound hole is opened in the compression stroke.

The shutoff member is an annular disc and a seat surface on which the shutoff member is seated in a close contact state is formed on the rebound flange.

The elastic member includes: an annular fixed portion fixed to the rebound valve housing; a plurality of elastic supporting portions formed to be inclined from the fixed portion toward the shutoff member, radially formed from a center of the fixed portion, and elastically supporting the shutoff member; and contact portions bending from ends of the elastic supporting members to be in contact with the shutoff member.

The post member includes: a hollow first fixing part in which the compression solenoid valve is inserted and fixed; a hollow second fixing part in which the rebound solenoid valve is inserted and fixed; and a connection part that connects the first and second fixing parts and has the communicating hole.

The compression solenoid valve controls a damping force by controlling flow of fluid that is sent from the compression chamber to the reservoir chamber in a compression stroke.

A portion of fluid in the rebound chamber is sent to the compression chamber through the rebound solenoid valve, the post member, and the compression solenoid valve in a rebound stroke.

A damping force controlling shock absorber according to a preferred embodiment of the present disclosure includes: a cylinder formed in a double structure of an inside and an outside, having an internal space divided into a compression chamber and a rebound chamber by a piston valve, and having a reservoir chamber in an external space; a compression solenoid valve mounted on the cylinder; a rebound solenoid valve mounted on the cylinder; and a check valve disposed in the rebound solenoid valve, and opening and closing a channel connecting the reservoir chamber and the rebound chamber, wherein, in a compression stroke, a portion of fluid in the compression chamber is sent to the reservoir chamber through the compression solenoid valve, and a portion of fluid in the reservoir chamber is sent to the rebound chamber through the channel due to opening of the check valve, and a portion of fluid in the rebound chamber is sent to the compression chamber through the rebound solenoid valve and the compression solenoid valve in a rebound stroke.

According to a damping force controlling shock absorber of the present disclosure, the following effects can be expected.

First, the fluid discharged from the rebound solenoid valve flows into the high-pressure compression chamber rather than the low-pressure reservoir chamber in the rebound stroke, so it is possible to improve operational independence of the compression solenoid valve and the rebound solenoid valve. Accordingly, it is possible to prevent reduction of a damping force which may occur due to cooperative operation of the solenoid valves.

Further, since the fluid in the reservoir chamber flows into the rebound chamber through the check valve in the compression stroke, it is possible to prevent a shortage of the fluid in the rebound chamber in the compression stroke. Accordingly, it is possible to prevent reduction of a damping force due to a lag when the compression chamber is changed into the rebound chamber.

Through these technological characteristics, when the rebound stroke is a soft mode, a soft mode and a hard mode both can be applied to the compression stroke, so it is possible to satisfy various wants of consumers. In particular, even though a hard mode is applied to the compression stroke to maximize a handling characteristic, stable driving is possible without reduction of a damping force due to a lag.

DETAILED DESCRIPTION

Hereinafter, a damping force controlling shock absorber according to a preferred embodiment of the present disclosure is described in detail with reference to the accompanying drawings.

Figure 1:
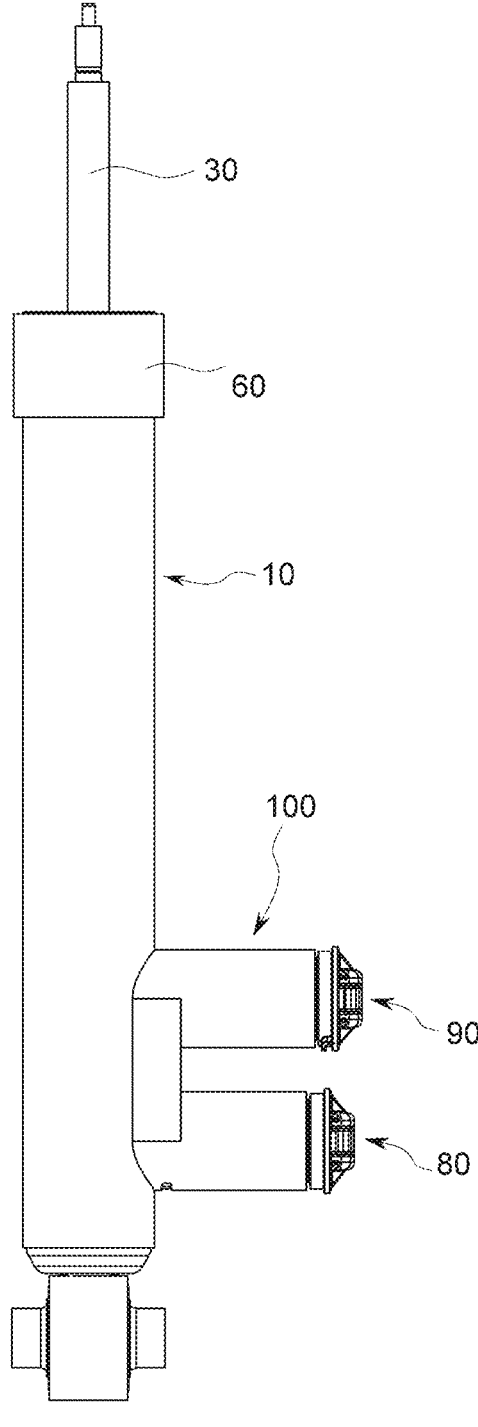
FIG. 1 is a view showing the external appearance of a damping force controlling shock absorber according to a preferred embodiment of the present disclosure.
Figure 2:
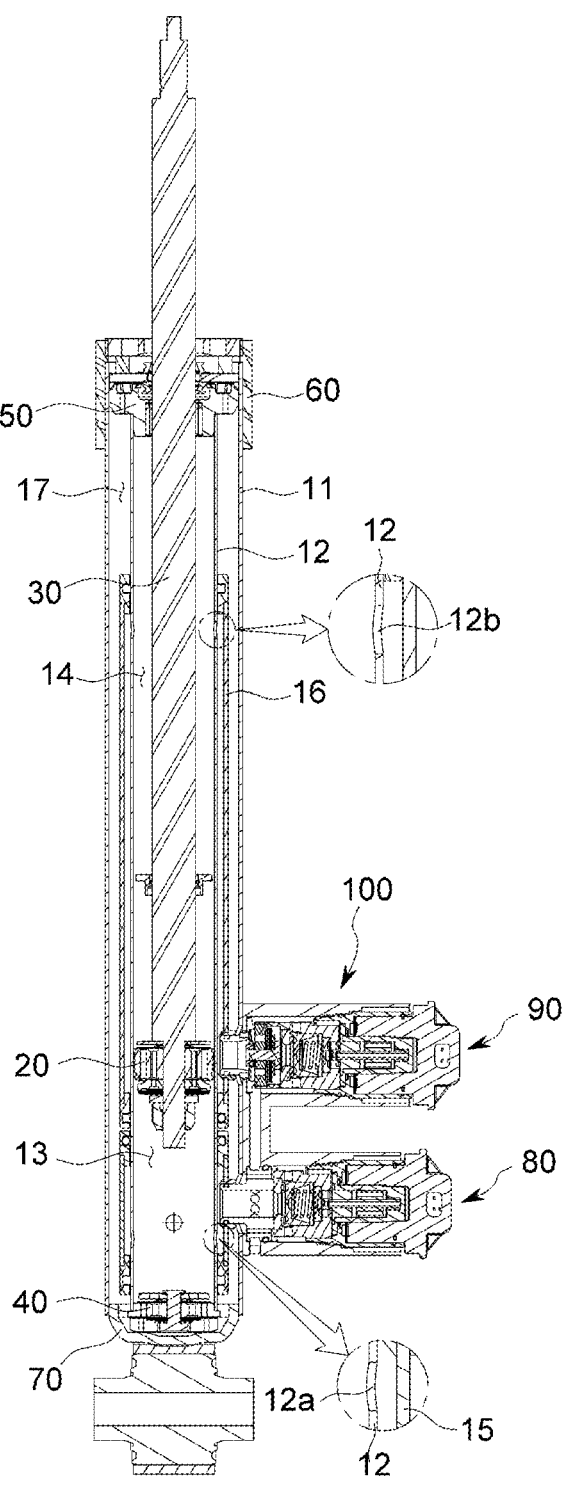
FIG. 2 is a cross-sectional view of the damping force controlling shock absorber according to a preferred embodiment of the present disclosure.

In the accompanying drawings, FIG. 1 is a view showing the external appearance of a damping force controlling shock absorber according to a preferred embodiment of the present disclosure, and FIG. 2 is a cross-sectional view of the damping force controlling shock absorber according to a preferred embodiment of the present disclosure.

A damping force controlling shock absorber according to a preferred embodiment of the present disclosure includes a cylinder 10, a piston valve 20, a piston rod 30, a body valve 40, a rod guide 50, an upper cap 60, a lower cap 70, solenoid valves 80 and 90, and a post member 100.

The cylinder 100 has a double structure, in which an inner tube 12 is installed in a base shell 11 with a gap therebetween, and is filled with fluid. The piston valve 20 slides into the inner tube 12 and the internal space of the inner tube 12 is divided into a compression chamber 13 and a rebound chamber 14 by the piston valve 20. Between the base shell 11 and the inner tube 12, a compression separator tube 15 and a rebound separator tube 16 are mounted on the outer surface of the inner tube 12 with a gap therebetween. The compression separator tube 15 and the rebound separator tube 16 form intermediate chambers connected to the compression chamber 13 and the rebound chamber 14, respectively, between the inner tube 12 and the compression separator tube 15 and the rebound separator tube 16.

The compression chamber 13 is formed at the lower portion of the cylinder 10 and the rebound chamber 14 is formed at the upper portion of the cylinder 10. In correspondence to this configuration, the compression separator tube 15 are mounted at the lower portion of the inner tube 12 and the rebound separator tube 16 is mounted at the upper portion of the inner tube 12. Connection holes 12*a* and 12*b* connecting the intermediate chambers to the compression chamber 13 and the rebound chamber 14, respectively, are formed at the lower portion and the upper portion of the inner tube 12, respectively.

A reservoir chamber 17 that compensates for variation of the internal volumes of the compression chamber 13 and the rebound chamber 14 when the piston valve 20 reciprocates is formed in the space between the base shell 11 and the inner tube 12 except for the intermediate chambers.

The piston valve 20 presses the fluid in the compression chamber 13 and the rebound chamber 14 while reciprocating in the internal space of the inner tube 12. A bypass channel for enabling fluid to flow between the compression chamber 13 and the rebound chamber 14 in a compression stroke and a rebound stroke is formed in the piston valve 20, and a shutoff valve is disposed in the bypass channel.

The piston rod 30 slidably passes through the rod guide 50 closing the upper end of the cylinder 10. The piston valve 20 is mounted at the lower end of the piston rod 30 and the upper end of the piston rod 30 is fixed to a car body.

The body valve 40 is installed at the lower end of the inner tube 12 and separates the compression chamber 13 and the reservoir chamber 17. A channel enabling fluid to flow between the two chambers 13 and 17 is formed in the body valve 40.

The rod guide 50 closes the upper end of the cylinder 10 and a guide hole that guides up-down movement of the piston rod 30 is formed through the center of the rod guide 50.

Meanwhile, an upper cap 60 and a lower cap 70 that cover the upper end and the lower end of the cylinder 10, respectively, are mounted on the upper end and the lower end of the cylinder 10, respectively. The upper cap 60 is mounted outside the upper end portion of the base shell 11 in the type of surrounding the upper end portion of the base shell 11 and the lower cap 70 is mounted inside the lower end portion of the base shell 11 in the type of surrounding the body valve 40.

The solenoid valves 80 and 90, which are mounted on the cylinder 10 through the post member 100, are composed of a compression solenoid valve 80 variably controlling a damping force in the compression stroke and a rebound solenoid valve 90 variably controlling a damping force in the rebound stroke.

The post member 100 is mounted outside the cylinder 10, thereby fixing and supporting the solenoid valves 80 and 90 with a gap therebetween.

Figure 3:
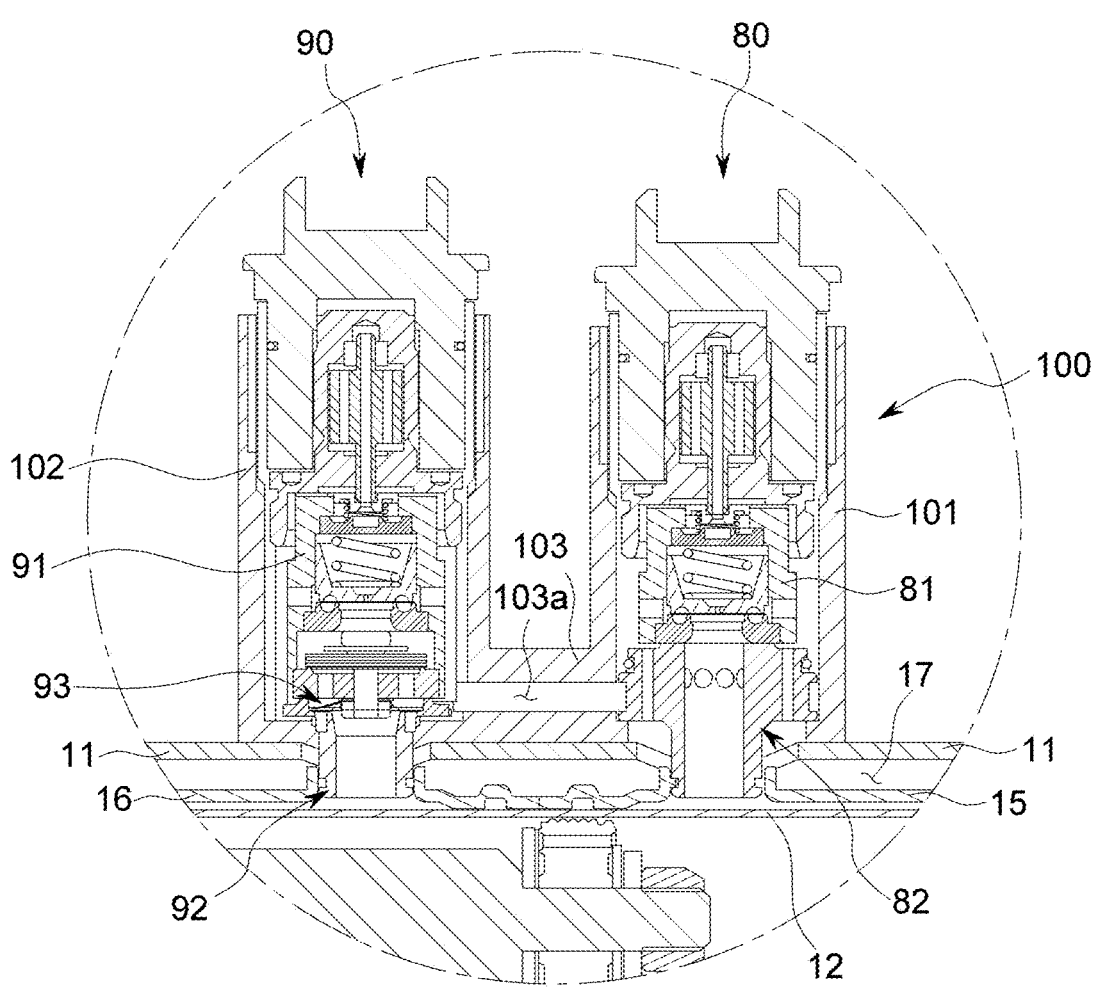
FIG. 3 is an enlarged cross-sectional view of the part of a solenoid valve shown in FIG. 2.
Figure 4:
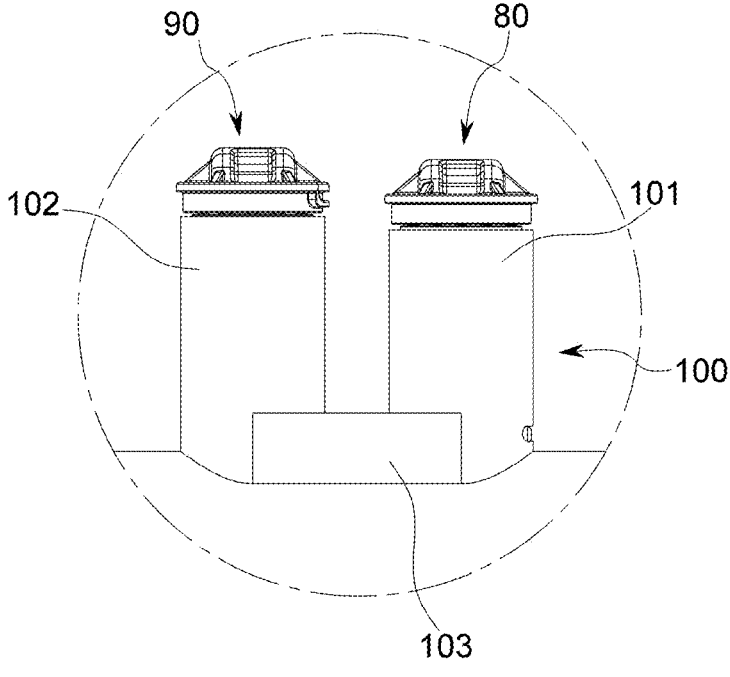
FIG. 4 is an enlarged view of the part of a post member shown in FIG. 1.
Figure 5:
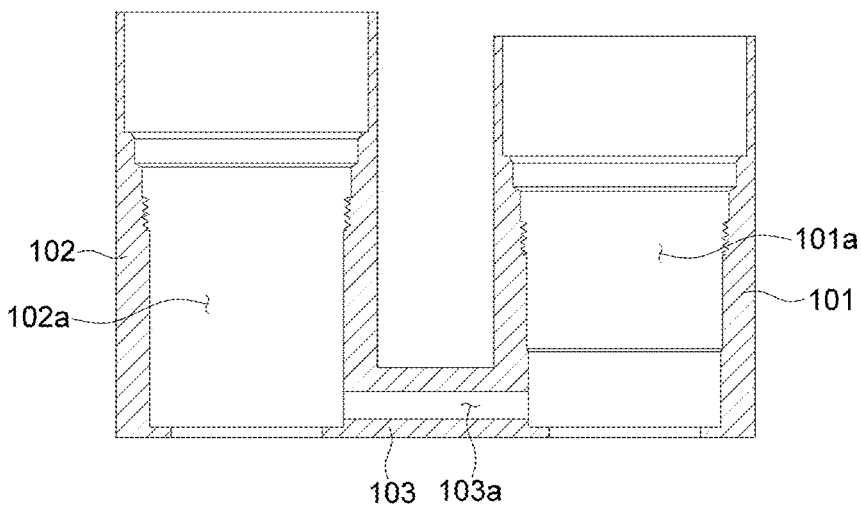
FIG. 5 is a cross-sectional view of the post member shown in FIG. 4.
Figure 6:
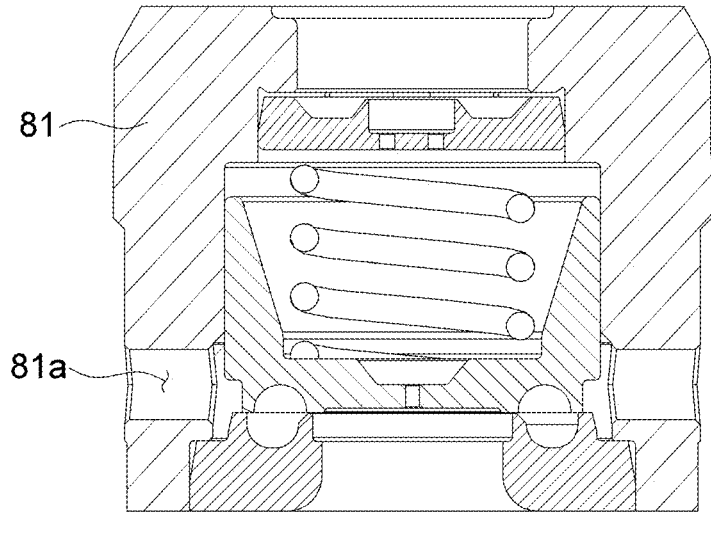
FIG. 6 is a cross-sectional view of a compression valve housing shown in FIG. 3.
Figure 7:
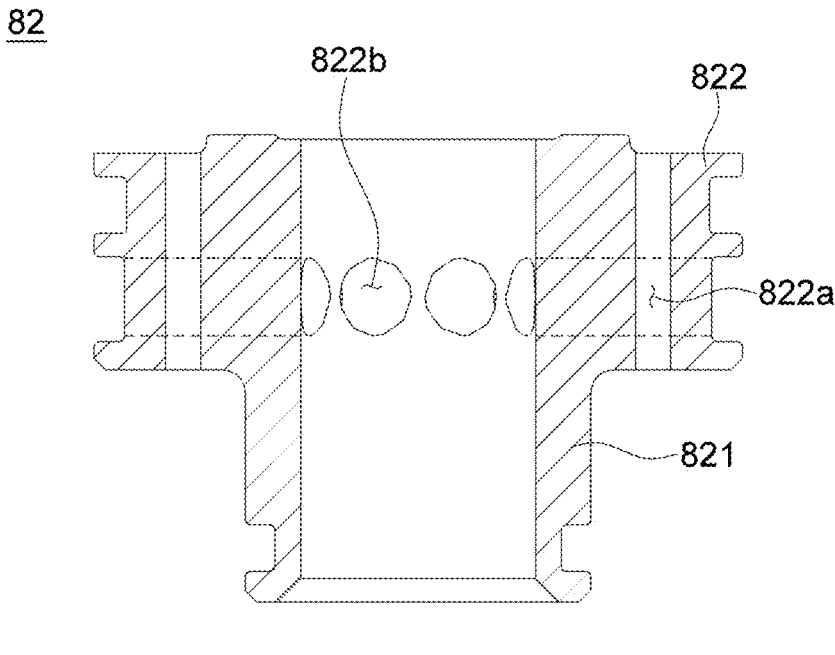
FIG. 7 is a cross-sectional view of a compression port shown in FIG. 3.
Figure 8:
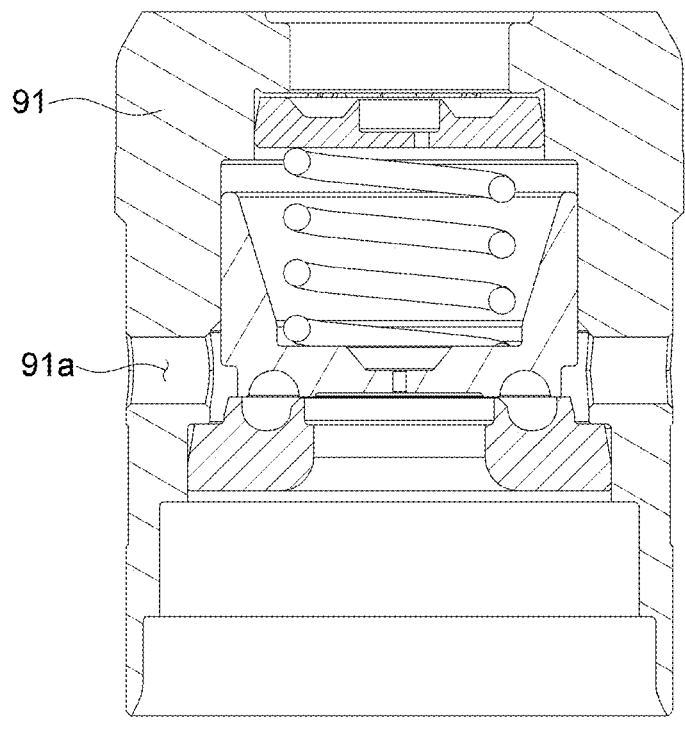
FIG. 8 is a cross-sectional view of a rebound valve housing shown in FIG. 3.
Figure 9:
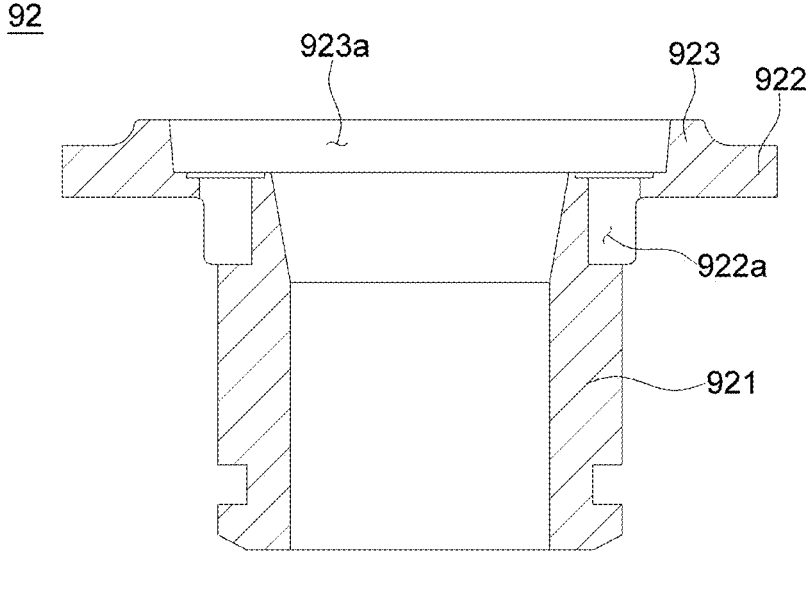
FIG. 9 is a cross-sectional view of a rebound port shown in FIG. 3.
Figure 10:
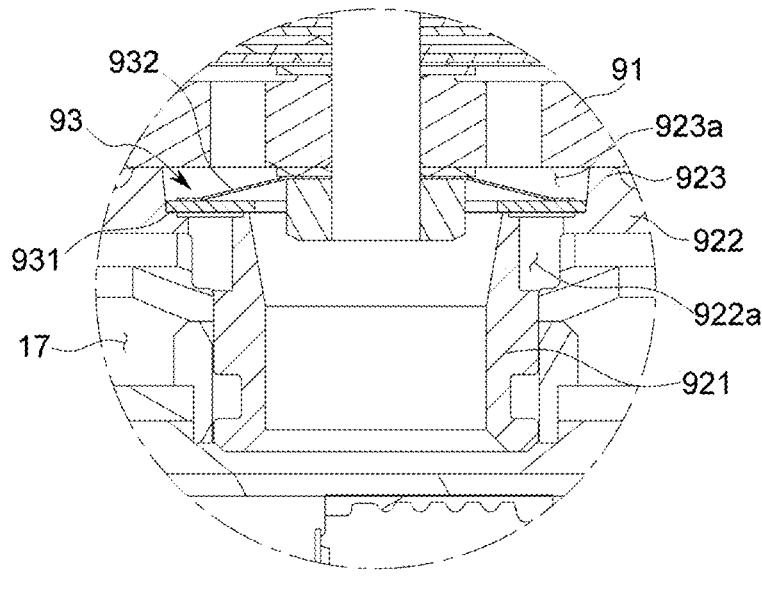
FIG. 10 is an enlarged cross-sectional view of an installation state of a check valve shown in FIG. 3.

In the accompanying drawings, FIG. 3 is an enlarged cross-sectional view of the part of a solenoid valve shown in FIG. 2, FIG. 4 is an enlarged view of a post member shown in FIG. 1, FIG. 5 is a cross-sectional view of the post member shown in FIG. 4, FIG. 6 is a cross-sectional view of a compression valve housing shown in FIG. 3, FIG. 7 is a cross-sectional view of a compression port shown in FIG. 3, FIG. 8 is a cross-sectional view of a rebound valve housing shown in FIG. 3, FIG. 9 is a cross-sectional view of a rebound port shown in FIG. 3, and FIG. 10 is an enlarged cross-sectional view of an installation state of a check valve shown in FIG. 3.

Herein, the post member 100 is described first, and the solenoid valves 80 and 90 and a check valve 93 to be described below are described later.

The post member 100 includes a hollow first fixing part 101 in which the compression solenoid valve 80 is inserted and fixed, a hollow second fixing part 102 that is spaced apart from the first fixing part 101 and in which the rebound solenoid valve 90 is inserted and fixed, and a connection part 103 that connects the first and second fixing parts 101 and 102. A communicating hole 103*a* that directly connects the compression solenoid valve 80 and the rebound solenoid valve 90 by connecting the internal spaces of the first and second fixing parts 101 and 102 is formed in the connection part 103.

A first accommodation space 101*a* in which the compression solenoid valve 80 is inserted and fixed is formed in the first fixing part 101. A compression port 82 to be described below of the compression solenoid valve 80 is connected to a compression separator tube 15 through the lower end of the first fixing part 101.

A second accommodation space 102*a* in which the rebound solenoid valve 90 is inserted and fixed is formed in the second fixing part 102. A rebound port 92 to be described below of the rebound solenoid valve 90 is connected to a rebound separator tube 16 through the lower end of the second fixing part 102.

The communicating hole 103*a* formed in the connection part 103 includes one or more communicating holes so that fluid that is discharged from the rebound solenoid valve 90 can be sufficiently guided to the compression solenoid valve 80. The communicating hole 103*a* is formed parallel with the center axis of the bypass shell 11.

The compression solenoid valve 80 includes a compression valve housing 81 and a compression port 82. The compression valve housing 81 forms the external appearance of the valve and is inserted and fixed in the first fixing part 101 of the post member 100. A damping force is variably controlled by adjusting a electric current that is applied to the valve while fluid flows through the compression valve housing 81. The compression port 82, which is disposed at the inlet of the compression valve housing 81 and at which fluid flows inside and outside, is inserted and fixed in the first fixing part 101 of the post member 100.

In the compression stroke, a portion of the fluid in the compression chamber 13 is guided toward the compression valve housing 81 through the compression port 82 and is discharged to the reservoir chamber 17 after circulating in the compression solenoid valve 80. The compression solenoid valve 80 has an anti-backflow structure to prevent backflow to the compression chamber 13 in this process.

A first compression hole 81*a* for discharging fluid, which circulates in the compression solenoid valve 80, toward the reservoir chamber 17 is formed in the side of the compression valve housing 81.

The compression port 82 includes a hollow compression body 821 connected at a first end to the compression separator tube 15, and a compression flange 822 extending outward from a second end of the compression body 821 in a direction that perpendicularly crossing the center line of the compression body 821.

The second end of the compression body 821 is in close contact with the compression valve housing 81 in a surface contact type. Accordingly, in the compression stroke, fluid that flows inside through the first end of the compression body 821 can be guided into the compression valve housing 81 without leaking to the outside.

A plurality of second compression holes 822*a* for guiding fluid, which has circulated in the compression solenoid valve 80, to the reservoir chamber 17 is formed parallel with and around the center hole in the compression body 821.

A plurality of third compression holes 822*b* connected to the post member 100 is formed in the compression flange 822 to perpendicularly communicate with the center hole in the compression body 821.

The second compression holes 822*a* and the third compression holes 822*b* are spaced apart from each other without communicating with each other. The third compression holes 822*b* are formed between the second compression holes 822*a*.

The rebound solenoid valve 90 includes a rebound valve housing 91, a rebound port 92, and a check valve 93. The rebound valve housing 91 forms the external appearance of the valve and is inserted and fixed in the second fixing part 101 of the post member 102. A damping force is variably controlled by adjusting a electric current that is applied to the valve while fluid flows through the rebound valve housing 91. The rebound port 92, which is disposed at the inlet of the rebound valve housing 91 and at which fluid flows inside and outside, is inserted and fixed in the second fixing part 102 of the post member 100. The check valve 93 is installed between the rebound valve housing 91 and the rebound port 92.

In the rebound stroke, a portion of the fluid in the rebound chamber 14 flows inside through the rebound port 92, is guided toward the rebound valve housing 92, and is then discharged after circulating in the rebound solenoid valve 90. The rebound solenoid valve 90 has an anti-backflow structure to prevent backflow to the rebound chamber 14 in this process.

A plurality of first rebound holes 91*a* for discharging fluid, which has passed through the rebound solenoid valve 90, is formed in the side of the rebound valve housing 91. Fluid that is discharged through the first rebound hole 91*a* is sent to the communicating hole 103*a* of the connection part 103 through between the rebound valve housing 91 and the inner surface of the second fixing part 102 constituting the post member 100.

The rebound port 92 has a hollow rebound body 921 connected at a first end of a separator tube 16, a rebound flange 922 extending outward from second end of the rebound body 921 in a direction perpendicular to the center line of the rebound body 921, and an annular protrusion 923 protruding toward the rebound valve housing 91 from a surface of the rebound flange 922 in close contact with the rebound valve housing 91. A fluid movement passage and an installation space of the check valve 93 are formed inside the protrusion 923.

A plurality of second rebound holes 922*a* connecting an internal space 923*a* formed by the protrusion 923 and the reservoir chamber 17 to each other is formed in the rebound flange 922. The second rebound holes 922*a* is formed parallel with and around the center hole of the rebound body 921.

The check valve 93 opens/closes a channel such that a portion of the fluid in the reservoir chamber 17 flows into the rebound chamber 14 through the rebound solenoid valve 90 in the compression stroke. The check valve 93 is opened only in the compression stroke and is closed in the rebound stroke.

The flow path of fluid through the check valve 93 is connected to the reservoir chamber 17, the second rebound holes 922*a* of the rebound flange 922, the internal space 923*a* surrounded by the protrusion 923, the center hole of the rebound body 921, the intermediate chamber formed by the rebound separator tube 16, and the rebound chamber 14.

The check valve 93 includes a shutoff member 931 that opens/closes a channel, and an elastic member 932 that elastically supports the shutoff member 931. The shutoff member 931 opens/closes the upper ends of the second rebound holes 922*a* in the internal space 932*a* surrounded by the protrusion 923. The elastic member 932 is disposed between the shutoff member 931 and the rebound valve housing 91 in the internal space 923*a* and elastically supports the shutoff member 931 with respect to the rebound valve housing 91.

Figure 11:
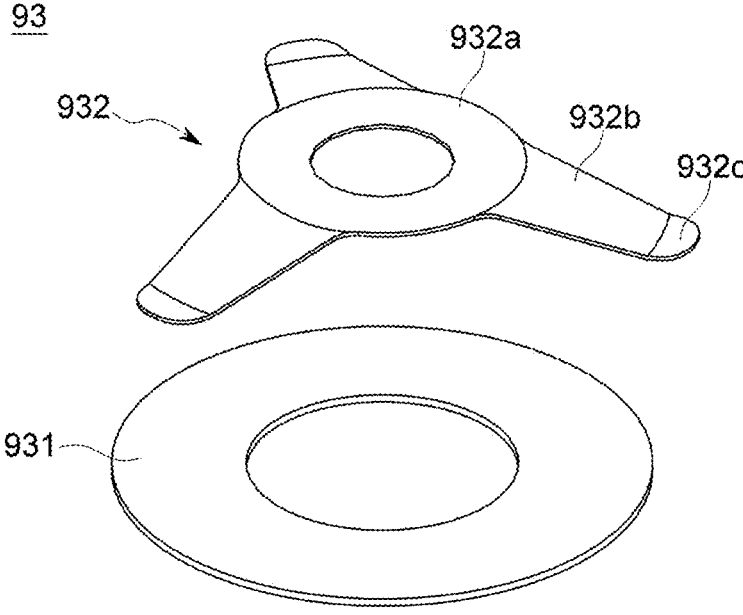
FIG. 11 is a perspective view of a shutoff member and an elastic member constituting the check valve.

In the accompanying drawings, FIG. 11 is a perspective view of a shutoff member and an elastic member constituting the check valve.

The shutoff member 931, which is an annular disc, is disposed in the internal space 932a of the protrusion 923 constituting the rebound port 92. A seat surface on which the shutoff member 931 is seated in a close contact state is formed on the rebound flange 922. The shutoff member 931 opens/closes the upper ends of the second rebound holes 922a in the internal space 932a of the protrusion 923. The shutoff member 931 is operated in a lifting type in which it is entirely lifted from the upper ends of the second rebound holes 922a, that is, the seat surface of the rebound flange 922 when it is opened.

The elastic member 932 includes an annular fixed portion 932a fixed to the rebound valve housing 91, a plurality of elastic supporting portions 932b formed to be inclined from the fixed portion 932a toward the shutoff member 931, radially formed from the center of the fixed portion 932a, and elastically supporting the shutoff member 931, and contact portions 932c bending from ends of the elastic supporting portions 932b to come in surface contact with the shutoff member 931.

Meanwhile, in the rebound stroke, fluid flowing inside through the rebound port 92 from the rebound chamber 14 is sent into the rebound valve housing 91 after passing through between the plurality of elastic supporting portions 932b. In this process, the check valve 93 is maintained in a closed state without opening.

Figure 12:
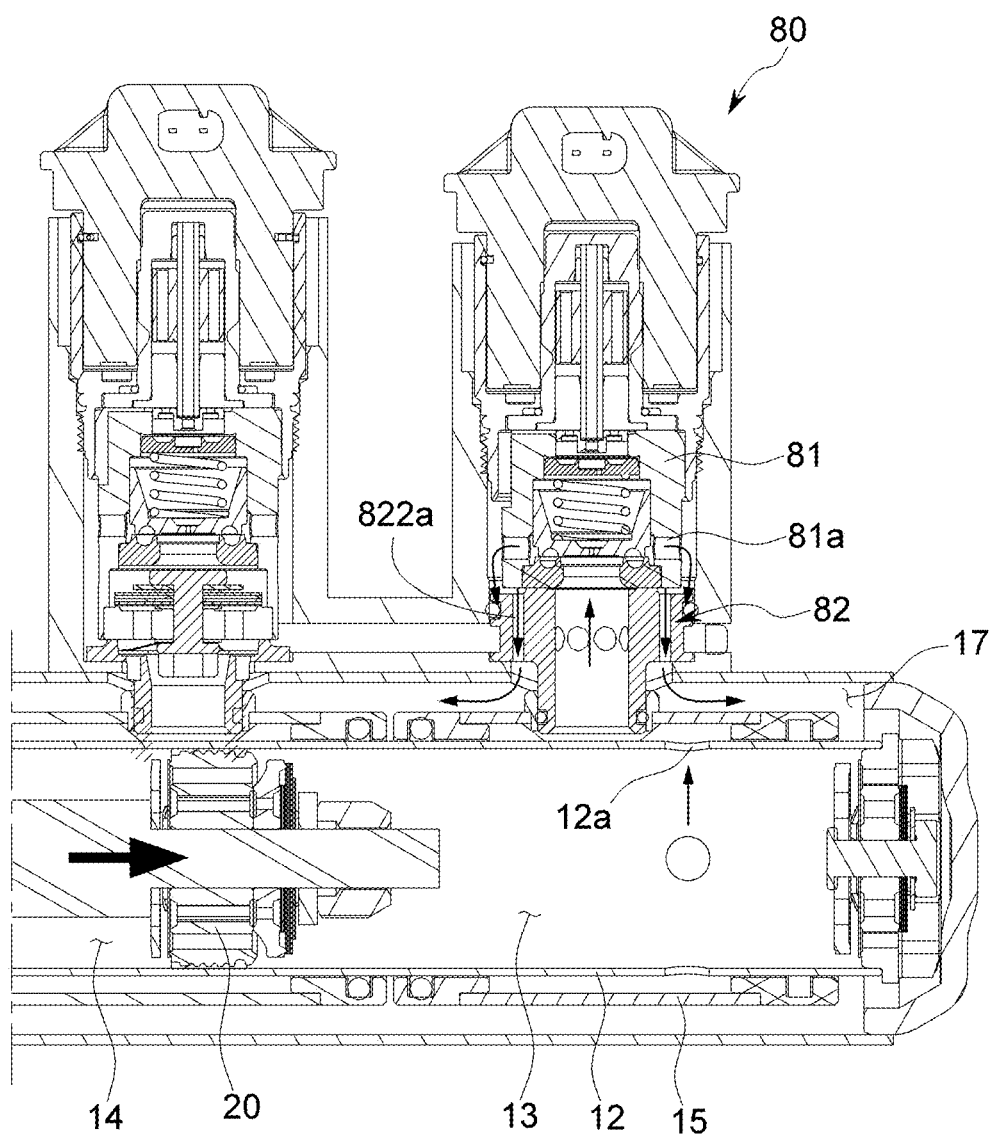
FIG. 12 is a cross-sectional view showing flow of fluid in a compression stroke.

In the accompanying drawings, FIG. 12 is a cross-sectional view showing flow of fluid in a compression stroke.

As shown in the figure, the fluid in the compression chamber 13 is compressed in the stroke in which the piston valve 20 moves down, that is, in the compression stroke. Accordingly, the inside of the compression chamber 13 becomes a high pressure state and the inside of the rebound chamber 14 becomes a low pressure state.

As the piston valve 20 moves down, a portion of the fluid in the compression chamber 13 flows into the rebound chamber 14 through the bypass channel formed in the piston valve 20, thereby generating a damping force.

Further, a portion of the fluid in the compression chamber 13 is sent to the intermediate chamber in the compression separator tube 15 through the connection hole 12a formed at the lower portion of the inner tube 12, and is then guided to the compression solenoid valve 80 through the compression port 82 and circulates in the compression solenoid valve 80. When the fluid circulates in the compression solenoid valve 80, a damping force is variably controlled by changing the electric current that is applied to the compression solenoid valve 80.

The fluid that has passed through the compression solenoid valve 80 is discharged to the reservoir chamber 17 through the first compression hole 81a of the compression valve housing 81 and the second compression hole 822a of the compression port 82.

Figure 13:
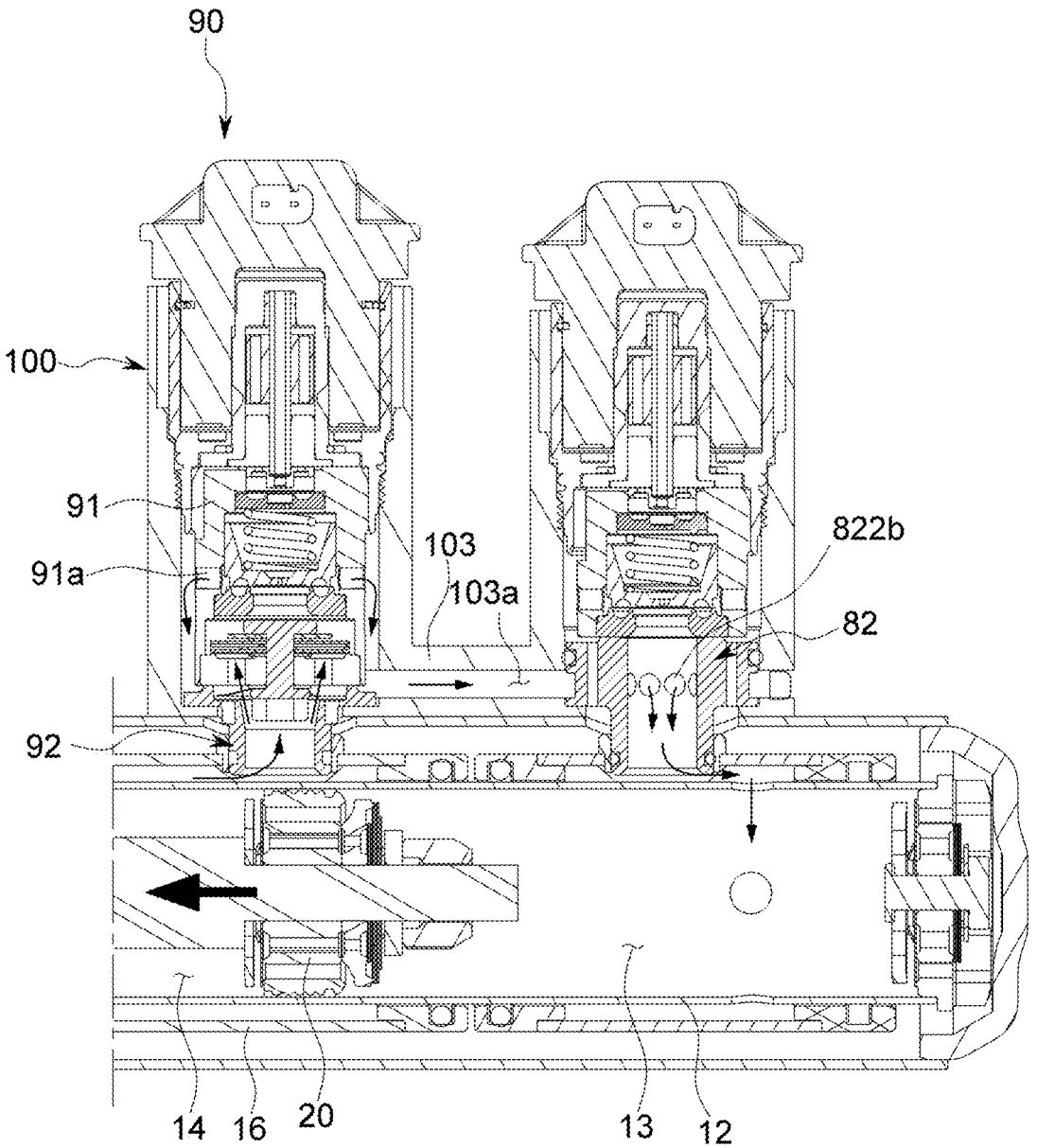
FIG. 13 is a cross-sectional view showing flow of fluid in a rebound stroke.

In the accompanying drawings, FIG. 13 is a cross-sectional view showing flow of fluid in a rebound stroke.

As shown in the figure, the fluid in the compression chamber 14 is compressed in the stroke in which the piston valve 20 moves up, that is, in the rebound stroke. Accordingly, the inside of the rebound chamber 14 becomes a high pressure state and the inside of the compression chamber 13 becomes a low pressure state.

As the piston valve 20 moves up, a portion of the fluid in the rebound chamber 14 flows into the compression chamber 13 through the bypass channel formed in the piston valve 20, thereby generating a damping force.

Further, a portion of the fluid in the rebound chamber 14 is sent to the intermediate chamber in the rebound separator tube 16 through the connection hole 12b formed at the upper portion of the inner tube 12, and is then guided to the rebound solenoid valve 90 through the rebound port 92 and circulates in the rebound solenoid valve 90. When the fluid circulates in the rebound solenoid valve 90, a damping force is variably controlled by changing the current that is applied to the rebound solenoid valve 90.

The fluid that has passed through the rebound solenoid valve 90 flows through the first rebound hole 91a of the rebound valve housing 91, between the rebound valve housing 91 and the post member 100, the communicating hole 103a of the connection part 103, the third compression hole 822b of the compression port 82, and the compression port 82, and then flows into the compression chamber 13.

Figure 14:
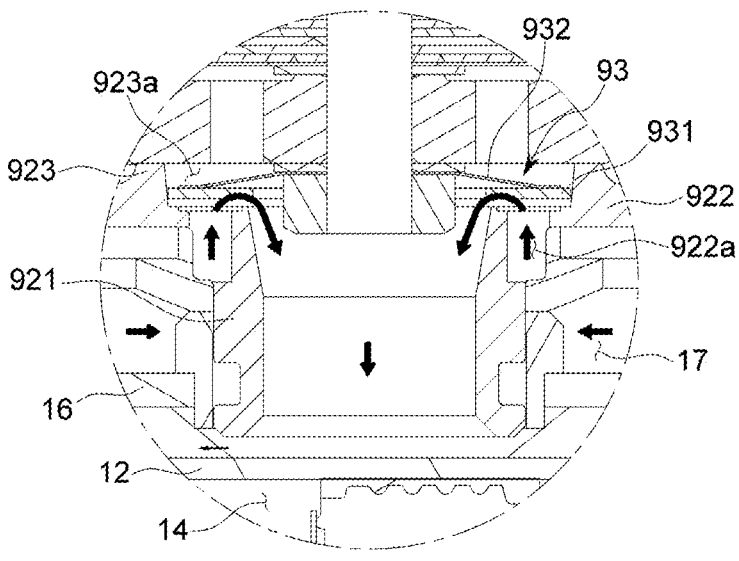
FIG. 14 is a cross-sectional view showing flow of fluid through the check valve in the compression stroke.
Figure 15:
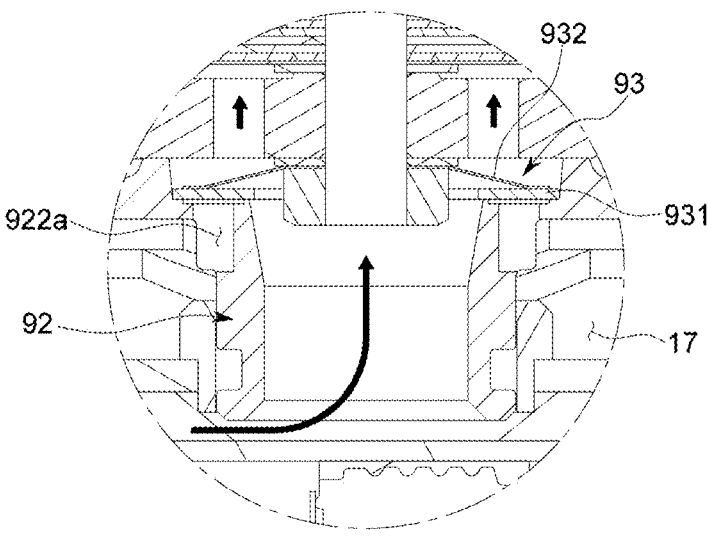
FIG. 15 is a cross-sectional view showing a closed state of the check valve in the rebound stroke.

In the accompanying drawings, FIG. 14 is a cross-sectional view showing flow of fluid through the check valve in the compression stroke, and FIG. 15 is a cross-sectional view showing a closed state of the check valve in the rebound stroke.

As described above, when the piston valve 20 moves down in the compression stroke, the fluid in the compression chamber 13 is compressed, the inside of the compression chamber 13 increases in pressure, and a portion of the compression chamber 13 flows into the rebound chamber 14 through the bypass channel formed in the piston valve 20, whereby a damping force is generated.

In the compression stroke, when the fluid in the rebound chamber 14 is insufficient, a lag may be generated when the compression stroke changes into the rebound stroke. Accordingly, according to the damping force controlling shock absorber of the present disclosure, in order to prevent a lag, the fluid in the reservoir chamber 17 is sent into the rebound chamber 14 through the rebound solenoid valve 90 in the compression stroke.

When the high-pressure fluid in the compression chamber 13 flows into the reservoir chamber 17 through the compression solenoid valve 80 in the compression stroke, the fluid pressure in the reservoir chamber 17 is also increased. As described above, the pressure in the rebound chamber 14 decreases in the compression stroke.

Accordingly, in the compression stroke, as shown in FIG. 14, a portion of the fluid in the reservoir chamber 17 flows inside through the lower ends of the second rebound holes 922a formed in the rebound flange 922 and flows into the internal space 923a of the protrusion 923 while pushing up the shutoff member 931. That is, in the compression stroke, the pressure of the fluid flowing inside through the second rebound holes 922a is larger than the pressing force of the elastic member 932 of the check valve 93, so the check valve 93 is opened.

The fluid flowing in the internal space 923a of the protrusion 923 flows into the rebound chamber 14 through the center hole of the rebound body 921, the intermediate chamber formed by the rebound separator tube 16, and the connection hole 12b formed at the upper portion of the inner tube 12.

Meanwhile, as described above, in the rebound stroke, the pressure of the inside of the rebound chamber 14 is increased and the pressure of the inside of the compression chamber 13 is decreased. Accordingly, the internal space of the rebound port 92 connected to the rebound chamber 14 is also increased.

Accordingly, since the fluid pressure in the rebound chamber 14 is increased and the fluid pressure in the reservoir chamber 17 is relatively decreased in the rebound stroke, as shown in FIG. 15, the shutoff member 931 closes the upper ends of the second rebound holes 922a while being pressed by the pressing force of the elastic member 932. Therefore, fluid is prevented from flowing into the rebound port 92 from the reservoir chamber 17.

Although the damping force controlling shock absorber according to a preferred embodiment of the present disclosure was described above with reference to the accompanying drawings, the present disclosure is not limited to the embodiment described above and may be modified in various ways within the claims.

| [Detailed Description of Main Elements] | |
| --- | --- |
| 10: Cylinder | 11: base shell |
| 12: inner tube | 13: compression chamber |
| 14: rebound chamber | 15: compression separator tube |
| 16: rebound separator tube | 17: reservoir chamber |
| 20: piston valve | 30: piston rod |
| 40: body valve | 50: rod guide |
| 60: upper cap | 70: lower cap |
| 80: compression solenoid valve | 81: compression valve housing |
| 82: compression port | 90: rebound solenoid valve |
| 91: rebound valve housing | 92: rebound port |
| 93: check valve | 100: post member |
| 101: first fixed portion | 102: second fixed portion |
| 103: connection part | |

What is claimed is:

1. A damping force controlling shock absorber comprising:

a cylinder formed in a double structure of an inside and an outside, having an internal space divided into a compression chamber and a rebound chamber by a piston valve, and having a reservoir chamber in an external space;

a compression solenoid valve mounted on the cylinder;

a rebound solenoid valve mounted on the cylinder; and a check valve disposed in the rebound solenoid valve, the check valve allowing for flow of fluid from the reservoir chamber to the rebound chamber and prevents flow of fluid in an opposite direction, wherein the rebound solenoid valve includes:

a rebound valve housing that forms an external appearance of the rebound solenoid valve and in which fluid in the rebound chamber flows and circulates in a rebound stroke; and a rebound port disposed at an inlet of the rebound valve housing, wherein the check valve is installed between the rebound valve housing and the rebound port, wherein the rebound port includes:

a rebound body having a hole therein and connected to the rebound chamber at a first end;

a rebound flange extending outward from a second end of the rebound body and having a rebound hole connected to the reservoir chamber; and an annular protrusion protruding toward and contacting the rebound valve housing from the rebound flange, having an internal space therein and forming a space in which the check valve is installed.

2. The damping force controlling shock absorber of claim 1, further comprising a post member mounted outside the cylinder, and fixing and supporting the solenoid valves with a gap therebetween.

3. The damping force controlling shock absorber of claim 2, wherein a communicating hole connecting the solenoid valves is formed in the post member.

4. The damping force controlling shock absorber of claim 1, wherein the check valve includes:

a shutoff member opening and closing the rebound hole; and an elastic member elastically supporting the shutoff member.

5. The damping force controlling shock absorber of claim 4, wherein the check valve is opened in a compression stroke and is closed in a rebound stroke.

6. The damping force controlling shock absorber of claim 5, wherein fluid flows through the reservoir chamber, the rebound hole, the internal space of the protrusion, the inside of the rebound body, and the rebound chamber.

7. The damping force controlling shock absorber of claim 6, wherein the shutoff member of the check valve is configured to open and close an upper end of the rebound hole, and the elastic member elastically supports the shutoff member with respect to the rebound valve housing.

8. The damping force controlling shock absorber of claim 7, wherein fluid in the reservoir chamber flows inside through a lower end of the rebound hole and pushes the shutoff member, so the rebound hole is opened in the compression stroke.

9. The damping force controlling shock absorber of claim 8, wherein the shutoff member is an annular disc and a seat surface on which the shutoff member is seated in a close contact state is formed on the rebound flange.

10. The damping force controlling shock absorber of claim 9, wherein the elastic member includes:

an annular fixed portion fixed to the rebound valve housing;

a plurality of elastic supporting portions formed to be inclined from the fixed portion toward the shutoff member, radially formed from a center of the fixed portion, and elastically supporting the shutoff member; and contact portions bending from ends of the elastic supporting members to be in contact with the shutoff member.

11. The damping force controlling shock absorber of claim 3, wherein the post member includes:

a hollow first fixing part in which the compression solenoid valve is inserted and fixed;

a hollow second fixing part in which the rebound solenoid valve is inserted and fixed; and a connection part that connects the first and second fixing parts and has the communicating hole.

12. The damping force controlling shock absorber of claim 1, wherein the compression solenoid valve controls a damping force by controlling flow of fluid that is sent from the compression chamber to the reservoir chamber in a compression stroke.

13. The damping force controlling shock absorber of claim 3, wherein a portion of fluid in the rebound chamber is sent to the compression chamber through the rebound solenoid valve, the post member, and the compression solenoid valve in a rebound stroke.

14. A damping force controlling shock absorber comprising:

a cylinder formed in a double structure of an inside and an outside, having an internal space divided into a compression chamber and a rebound chamber by a piston valve, and having a reservoir chamber in an external space;

a compression solenoid valve mounted on the cylinder;

a rebound solenoid valve mounted on the cylinder; and a check valve disposed in the rebound solenoid valve, the check valve allowing for flow of fluid from the reservoir chamber to the rebound chamber and prevents flow of fluid in an opposite direction,

wherein, in a compression stroke, a portion of fluid in the compression chamber is sent to the reservoir chamber through the compression solenoid valve, and a portion of fluid in the reservoir chamber is sent to the rebound chamber due to opening of the check valve, and a portion of fluid in the rebound chamber is sent to the compression chamber through the rebound solenoid valve and the compression solenoid valve in a rebound stroke, wherein the rebound solenoid valve includes:

a rebound valve housing that forms an external appearance of the rebound solenoid valve and in which fluid in the rebound chamber flows and circulates in a rebound stroke; and a rebound port disposed at an inlet of the rebound valve housing, wherein the check valve is installed between the rebound valve housing and the rebound port, wherein the rebound port includes:

a rebound body having a hole therein and connected to the rebound chamber at a first end;

a rebound flange extending outward from a second end of the rebound body and having a rebound hole connected to the reservoir chamber; and an annular protrusion protruding toward the rebound valve housing from the rebound flange, having an internal space therein and forming a space in which the check valve is installed.

15. The damping force controlling shock absorber of claim 14, wherein the check valve is opened in the compression stroke and is closed in the rebound stroke.

\* \* \* \* \*